United States Patent
Littau et al.

(10) Patent No.: US 6,422,498 B1
(45) Date of Patent: Jul. 23, 2002

(54) ADJUSTABLE BRAKE FOR BAITCAST REEL WITH INFINITE CONTROL

(75) Inventors: Christopher S. Littau, Bartlesville; Hyunkyu Kim, Broken Arrow, both of OK (US)

(73) Assignee: W. C. Bradley/Zebco Holdings, Inc., Columbus, GA (US)

( * ) Notice: Subject to any disclaimer, the term of this patent is extended or adjusted under 35 U.S.C. 154(b) by 22 days.

(21) Appl. No.: 09/654,623

(22) Filed: Sep. 5, 2000

(51) Int. Cl.[7] ............................................. A01K 89/01
(52) U.S. Cl. ........................................................ 242/288
(58) Field of Search .................................. 242/288, 289

(56) References Cited

U.S. PATENT DOCUMENTS

| | | | | |
|---|---|---|---|---|
| 2,482,863 A | * | 9/1949 | Nelson | 242/289 |
| 5,108,042 A | | 4/1992 | Puryear et al. | |
| 5,308,021 A | * | 5/1994 | Ikuta | 242/289 |
| 5,950,949 A | | 9/1999 | Cockerham | |
| 5,984,221 A | | 11/1999 | Kim | |
| 6,003,798 A | | 12/1999 | Kim | |
| 6,293,483 B1 | * | 9/2001 | Sato et al. | 242/289 |

* cited by examiner

*Primary Examiner*—Emmanuel M. Marcelo
(74) *Attorney, Agent, or Firm*—Fellers, Snider, Blankenship, Bailey & Tippens, P.C.

(57) ABSTRACT

A braking apparatus for a fishing reel comprising: a carrying structure for carrying a braking surface; at least one turnable cam including at least one ramp segment having an outer end and a base end; and at least one interacting member, projecting from the carrying structure, for interacting with the cam. The cam can be turned to selectively move the interacting member to any position between the base end and the outer end. When the interacting member is in contact with the base end, the braking surface will be located at a first position. When the interacting member is in contact with the outer end, the braking surface will be located at a second position different from the first position. The braking surface is positionable at any point between the first position and the second position. The inventive apparatus further comprises at least one biasing member for providing a biasing force such that, when the interacting member is positioned between the base end and the outer end of the ramp segment, the biasing force will act to cause the interacting member to remain in contact with the cam.

9 Claims, 9 Drawing Sheets

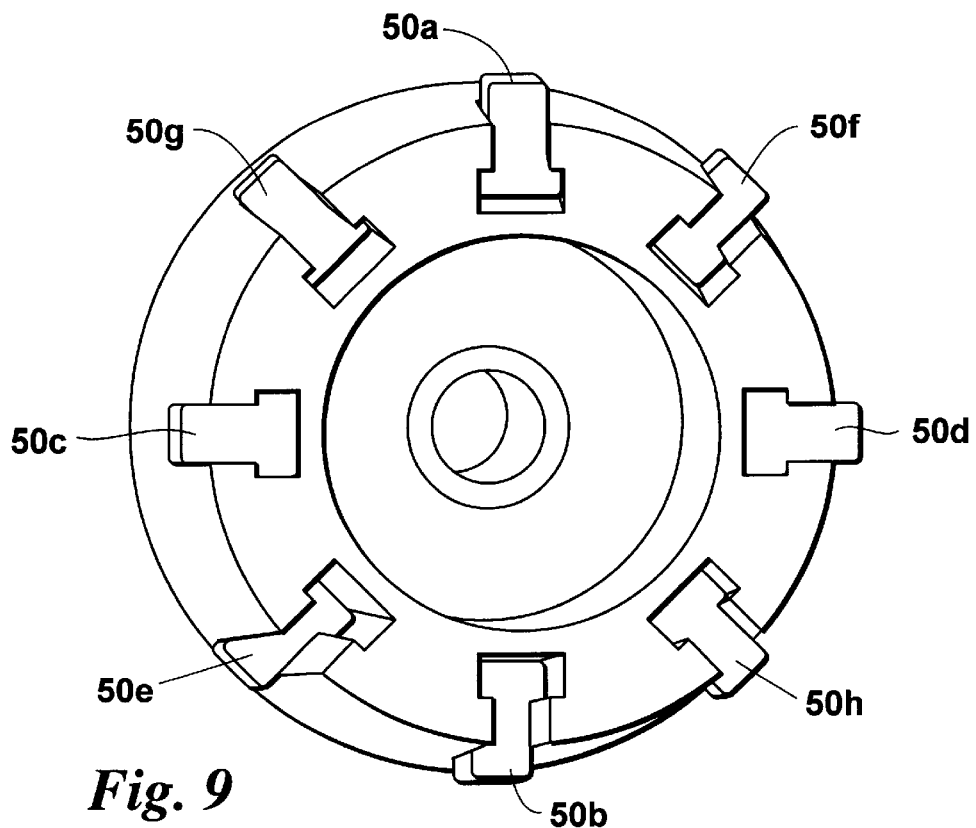
Fig. 9
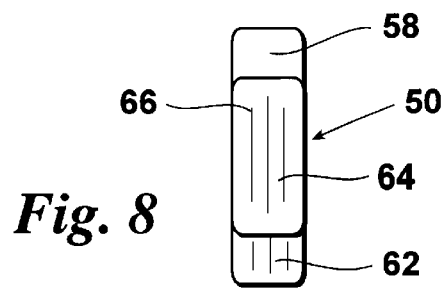
Fig. 8
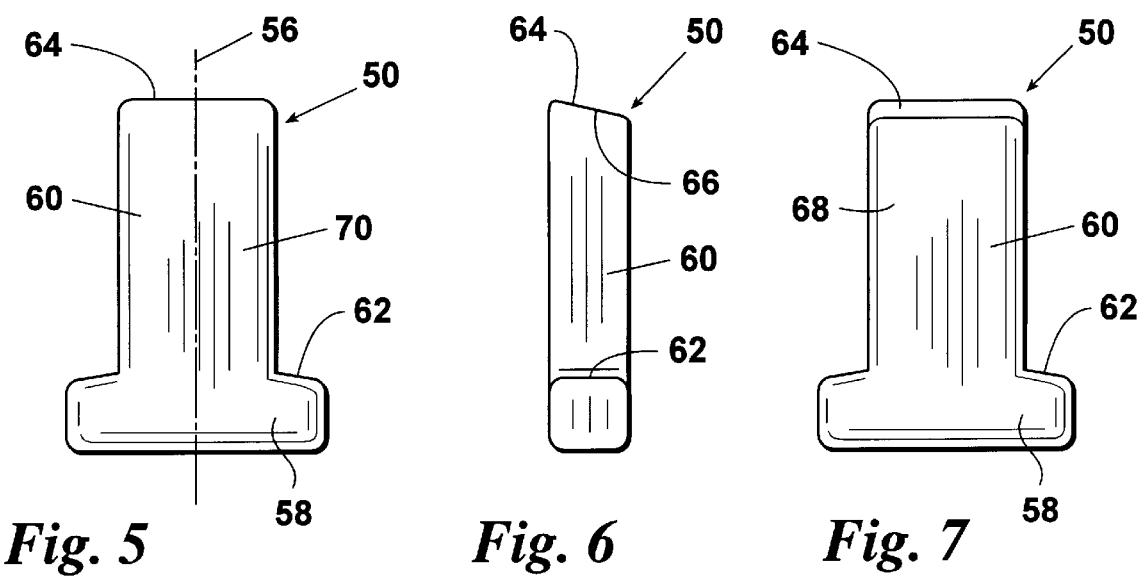
Fig. 5     Fig. 6     Fig. 7

ADJUSTABLE BRAKE FOR BAITCAST REEL WITH INFINITE CONTROL

BACKGROUND OF THE INVENTION

1. Field of the Invention

The present invention relates to adjustable braking systems for baitcast fishing reels.

2. Background of the Invention

Spool drag or spool braking systems are commonly used in baitcasting reels to alleviate line backlashing (also referred to as "line nesting") problems. Because they utilize transversely-oriented spools which rotate during casting, baitcasting reels are more prone to backlashing problems than are spinning reels and spin-casting reels. Such problems result primarily from the rotational momentum carried by the spool.

A number of braking systems have been developed to reduce backlashing problems. These braking systems have primarily used either a magnetic brake or a centrifugal brake. Centrifugal braking systems offer an advantage over magnetic systems in that, unlike magnetic systems, the braking force of a centrifugal brake increases as rotational speed increases.

Historically, there have been several limitations to centrifugal braking systems. U.S. Pat. No. 5,984,221, which is hereby incorporated by reference, provides a discussion of recognized limitations of past devices, namely, the fragility of the mechanism, the inconvenience of adjusting the braking force, size limitations, and problems associated with the balance of such devices.

U.S. Pat. No. 5,984,221 discloses an improved braking system which alleviates the problems mentioned above, requiring less space than previous systems and providing easy adjustment without disassembly. However, the U.S. Pat. No. 5,984,221 apparatus, by its nature, provides a limited number of discrete braking positions. As the brake ring is moved in, the braking force remains constant until another element begins to contact the brake ring. When an additional element does contact the brake ring, there is an incremental increase in the braking force. Even if the dial was continuously adjustable, the braking force would increment or decrement in discrete steps. The adjustment dial of the U.S. Pat. No. 5,984,221 device includes cams which have flat segments such that the brake ring may only be set to positions where brake elements will not rub against the edge of the brake ring which could cause increase wear and binding. While some fishermen prefer a reel with fixed positions for the ease of returning to a given setting, others prefer a continuous adjustment which will allow an individual to precisely tune the reel for a given lure and casting distance.

It is thus an object of the present invention to provide a centrifugal braking system for a baitcast reel which is infinitely adjustable over its braking range.

It is further object of the present invention to provide an infinitely adjustable centrifugal brake for a baitcast fishing reel which is easily adjustable by the user.

SUMMARY OF THE INVENTION

The present invention provides an infinitely adjustable braking apparatus which satisfies the needs and alleviates the problems mentioned above. As with other centrifugal braking systems, the inventive braking system provides a proportional braking force which desirably varies in relation to the rotational speed of the reel spool. However, the inventive system is not limited to a finite number of discrete braking positions as are previous systems which require comparable space and provide easy, external adjustment. Additionally, the inventive system ensures that individual braking elements will, when in braking position, contact the braking surface in a correct manner.

In one aspect, the inventive braking apparatus comprises: a carrying structure for carrying a braking surface; at least one turnable cam including at least one ramp segment having an outer end and a base end; and at least one interacting member, projecting from the carrying structure, for interacting with the cam. The cam can be turned to selectively move the interacting member to any position within its range of movement.

In another aspect, the present invention provides a braking apparatus for a fishing reel comprising: a frusto-conical contacting structure; a plurality of braking elements for contacting the contacting structure to generate a braking force; and placing means for selectively placing the contacting structure in any position relative to the braking elements along a range of positions.

Further objects, features, and advantages of the present invention will be apparent to those skilled in the art upon examining the accompanying drawings and upon reading the following description of the preferred embodiments.

BRIEF DESCRIPTION OF THE DRAWINGS

FIG. 5 provides an elevational rear view of a brake element employed in the inventive braking apparatus.

FIG. 6 provides an elevational side view of a brake element.

FIG. 7 provides an elevational front view of a brake element.

FIG. 8 provides an elevational top view of a brake element.

FIG. 9 provides a perspective view of a brake element housing employed in the inventive braking apparatus.

DESCRIPTION OF THE PREFERRED EMBODIMENTS

Figure 1:
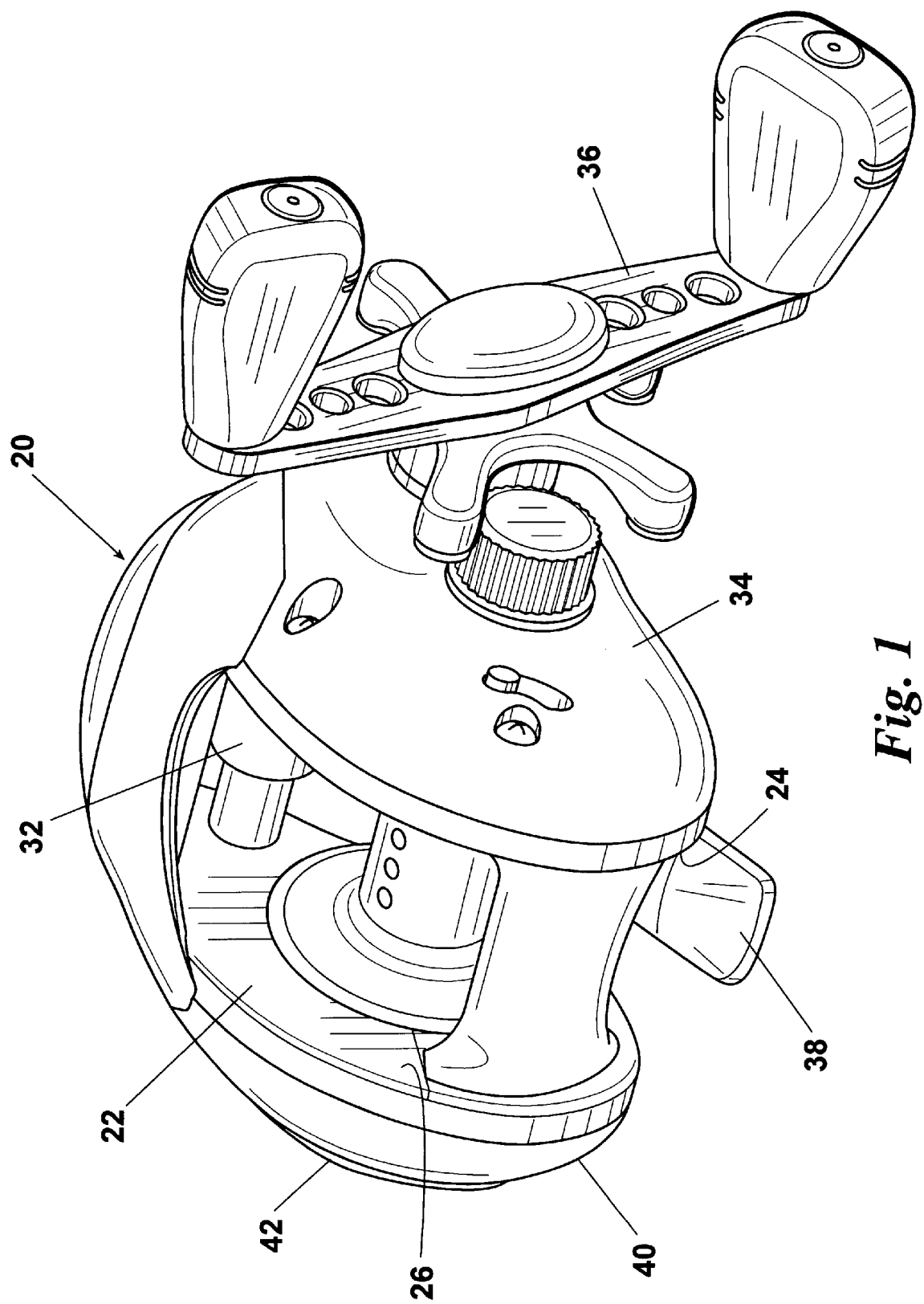
FIG. 1 provides a perspective view of a baitcasting reel incorporating an embodiment 1 of the inventive centrifugal braking apparatus with infinite control.

Depicted in FIG. 1 is a baitcasting reel 20 incorporating a preferred embodiment of the inventive, infinitely adjustable, centrifugal braking apparatus. Baitcasting reel 20 comprises: a frame 22 having a right side plate 24 and a left side plate 26; a line spool 28 rotatably mounted in frame 22 between side plates 24 and 26; a spool shaft 30 (FIG. 2) extending through spool 28; a level-wind mechanism 32 which traverses the spool during winding to ensure that the line is properly wound along the entire length of the spool; a right side cover 34 secured over side plate 24; a crank handle 36, operably extending from right cover 24, for rotating spool 28; a reel foot 38, provided on the bottom of frame 22, for attaching reel 20 to a fishing rod; and a left side cover 40 secured over left side plate 26. The inventive braking apparatus is housed within left side cover 40. When reel 20 is assembled, the only externally visible feature of inventive braking apparatus is a brake dial 42 projecting through a circular aperture 44 (FIG. 2) formed in left cover 40.

Although, for convenience, the inventive apparatus is herein shown and described as incorporated in a right-handed baitcasting reel, the inventive apparatus is equally adaptable for use in left-handed baitcasting reels. As will be understood by those skilled in the art, a left-handed version of generally any baitcasting reel can be produced by simply reversing the arrangement and structure of the reel's components such that the left-handed reel is a mirror image of the right-handed version of the reel.

Figure 2:
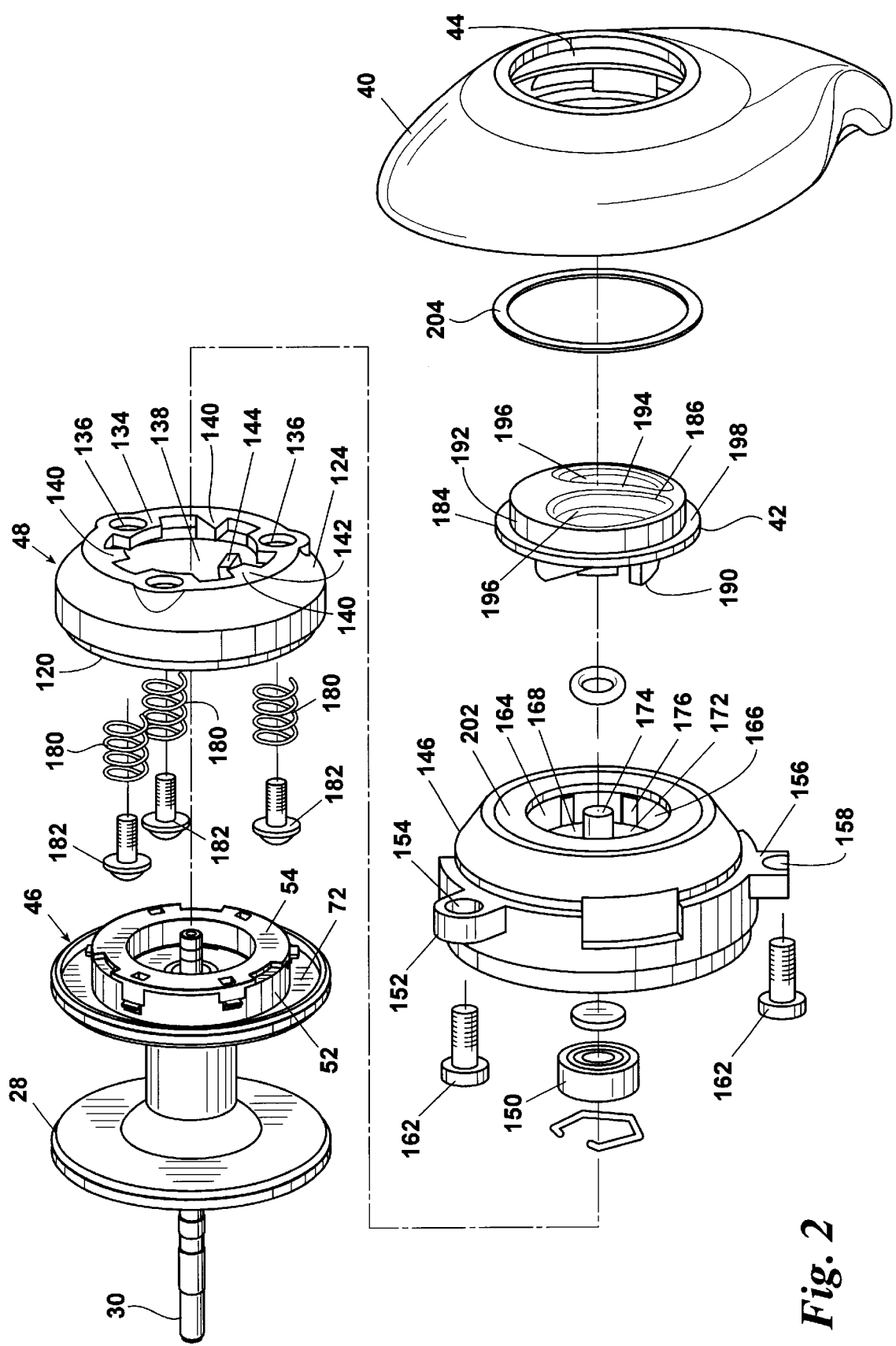
FIG. 2 provides an exploded perspective view of inventive braking apparatus viewed from the left.
Figure 3:
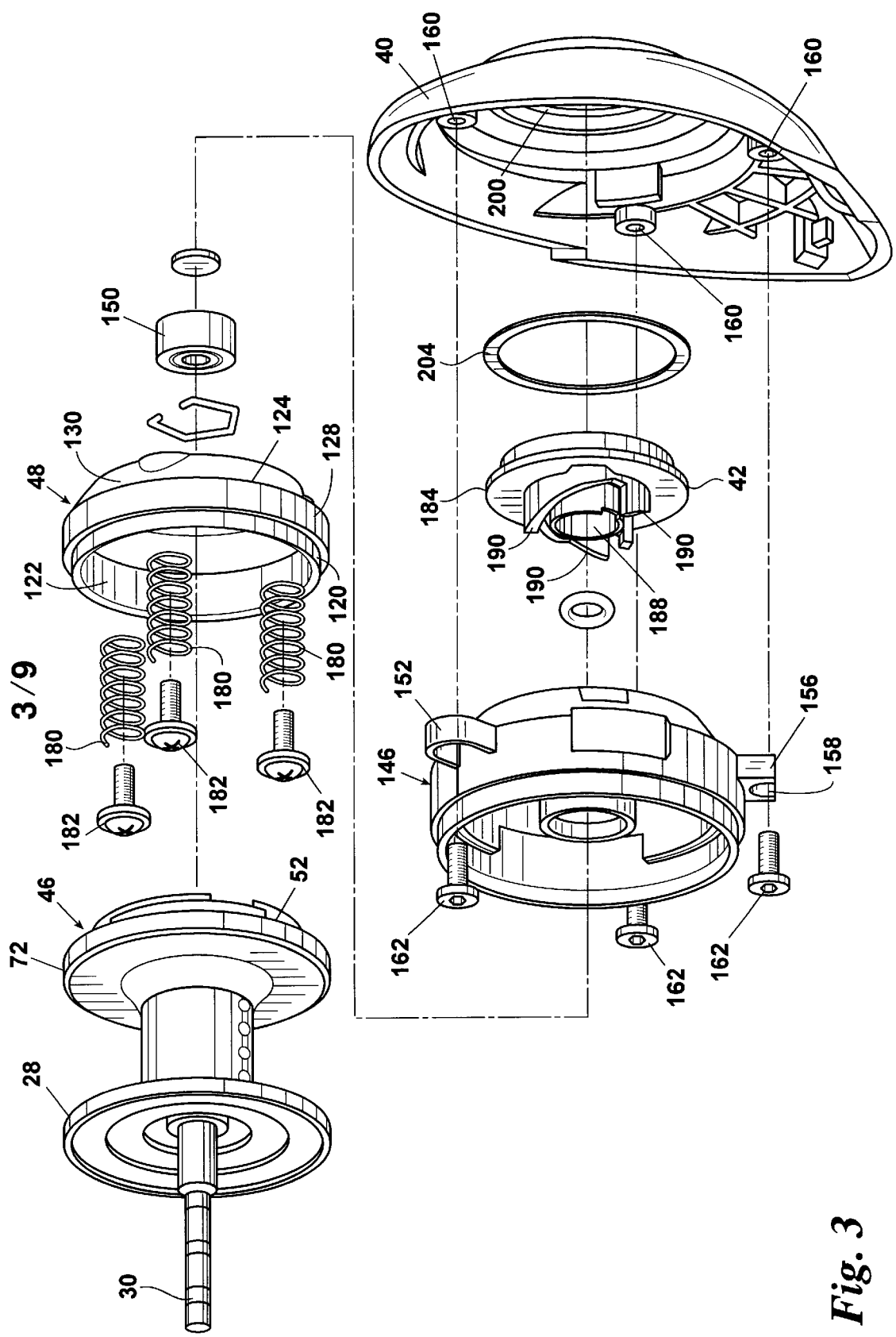
FIG. 3 provides an exploded perspective view of the inventive braking apparatus viewed from the right.

Referring now to FIGS. 2 and 3, the inventive braking apparatus preferably comprises: brake dial 42; an inventive brake element assembly 46; and a brake ring assembly 48. Inventive brake element assembly 46 preferably comprises: a plurality of brake elements 50 (FIG. 4); a brake element housing 52; and a housing cover 54.

As depicted in FIGS. 5–8, each brake element 50 is preferably a T-shaped structure having: a longitudinal axis 56; a wide retaining end 58; an elongate portion 60 extending from retaining end 58; and a pair of retaining shoulders 62 defined by the transition from retaining end 58 to elongate portion 60. Elongate portion 60 has a distal end 64 providing an angled brake pad 66. Each brake element 50 preferably has both a flat forward surface 68 and a flat rearward surface 70.

Figure 4:
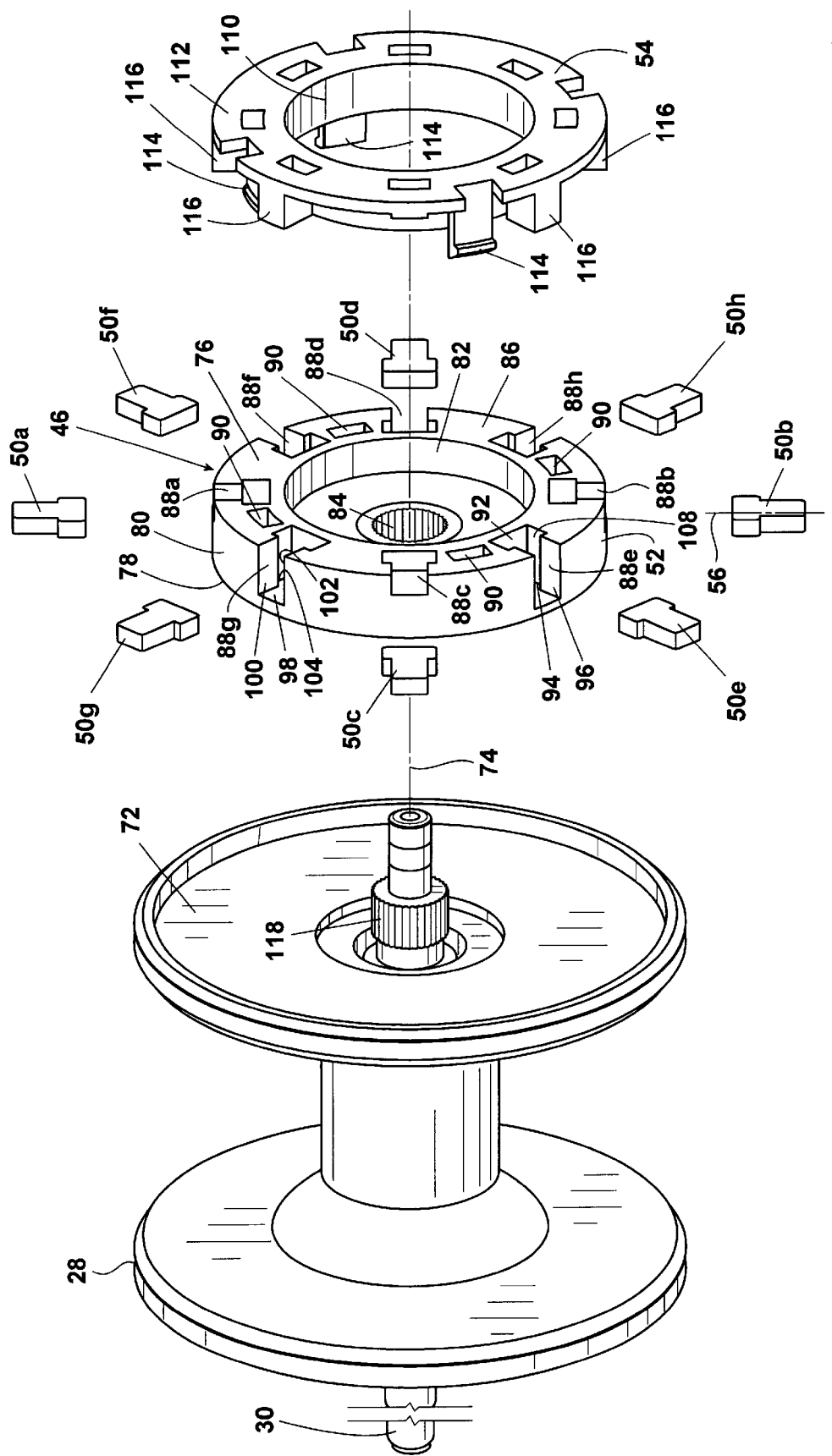
FIG. 4 provides an exploded perspective view of the spool and brake housing assembly incorporated in the inventive braking apparatus.

Referring next to FIG. 4, as used herein, the terms "forward" and "forwardly facing" describe features facing and/or positioned away from end 72 of line spool 28. The terms "rearward" and "rearwardly facing," on the other hand, describe features facing and/or positioned toward end 72.

Continuing with FIGS. 4 and 9, brake element housing 52 is preferably a substantially cylindrical member having: a longitudinal axis of rotation 74 (FIG. 3); a forward longitudinal end 76; a rearward longitudinal end 78; a cylindrical outer wall 80; a cylindrical bore 82 extending into forward end 76; a splined passage 84 extending from bore 82 through rearward end 78; a forward radial shoulder 86 extending between cylindrical outer wall 80 and cylindrical bore 82; and a plurality of radial slots 88a, 88b, 88c, 88d, 88e, 88f, 88g, and 88h for slidably holding brake elements 50. Housing 52 also includes a plurality of (preferably 4) chamfer slots 90.

Radial slots 88a–h include: forward openings 92 provided in forward radial shoulder 86; outer openings 94 provided in outer wall 80; and substantially T-shaped segments 96. Brake elements 50 are slidably received in T-shaped segments 96 for reciprocating radial movement. Each T-shaped segment 96 comprises: a flat radial bottom surface 98; a narrow radial passage 100 extending into housing 52 from outer opening 94; a back wall 102 perpendicular to bottom surface 98; and a wide inner segment 104 extending from narrow passage 100 to back wall 102. Narrow passages 100 are sized for slidably receiving the elongate portions 60 of brake elements 50. Inner segments 104 are sized for slidably receiving the wide retaining ends 58 of brake elements 50.

Each of slots 88a–h has a depth defined by the distance from forward radial shoulder 86 to the slot's bottom surface 98. Slots 88a–h are preferably evenly spaced around housing 52 and are preferably configured such that (a) slot 88a is diametrically opposed to slot 88b, (b) slot 88c is diametrically opposed to slot 88d, (c) slot 88e is diametrically opposed to slot 88f, (d) slot 88g is diametrically opposed to slot 88h, (e) the depth of slot 88h exceeds the depth of slot 88g which exceeds the depth of slot 88f, and so forth such that the slots 88a–h are progressively deeper with slot 88a having the least depth and slot 88h having the greatest depth. As explained hereinbelow, the differing depths of slots 88a–h, acting in concert with the frusto-conical brake ring, desirably allows an infinitely adjustable braking force over the range of brake settings.

Housing cover 54 comprises: a cylindrical ring 110; a flat, radial cap 112 extending outwardly from the forward end of ring 110; a plurality of (preferably 4) resilient chamfers 114 positioned outside of ring 110 and extending rearwardly from cap 112; and a plurality of bosses 116b, 116c, 116d, 116e, 116f, 166g, and 116h positioned outside of ring 110 and extending rearwardly from cap 112. Bosses 116b–h preferably have a size and shape corresponding to that of T-shaped slots 88b–h, respectively, such that bosses 116b–h are of progressively increasing height so as to fill the forward portion of slots 88b–h not occupied to by brake element 50, thereby retaining each brake element 50a–h at its rearmost position within the corresponding slot 88a–h. Thus, housing cover 54 operably retains brake elements 50 in the T-shaped segments 96 of housing slots 88a–h.

Braking element assembly 46 is secured in reel 20 such that assembly 46 rotates with spool 28. Splined passage 84 of housing 52 is received over an externally splined portion 118 of spool shaft 30. When secured in this manner, the rotational axis 74 of brake element assembly 46 is collinear with the rotational axis of spool 28.

When brake element assembly 52 rotates with spool shaft 30, the resulting centrifugal force urges elements 50 to slide radially outward in slots 88a–h away from axis 74. Braking elements 50 are sized such that, at least when elements 50 slide into their outermost radial positions, brake pads 66 (FIG. 6) project from housing 52 through the slot openings 94 formed in outer wall 80.

Referring again to FIGS. 2 and 3, brake ring assembly 48 comprises: a brake ring 120 having an interior frusto-conical braking surface 122; and a carrying structure or collar 124 for holding and carrying brake ring 120. As will be understood by those skilled in the art, brake ring assembly 48 could be replaced with a unitary structure wherein, for example, a frusto-conical braking surface is integrally formed in collar 124.

Collar 124 comprises: a body 126 having a substantially cylindrical rearward portion 128 and an inwardly tapered forward longitudinal end portion 130; a cylindrical bore 132, formed in the rearward portion 128, wherein brake ring 120 is press fit or otherwise retained; a flat, inwardly extending, forward end wall 134; a plurality of (preferably three) cylindrical bores 136 extending through, and evenly spaced around, end wall 134; a large central aperture 138 extending through end wall 134; and a plurality of (preferably three)

interacting structures 140 provided at the forward longitudinal end of body 130.

Interacting structures 140 project radially into, and are evenly spaced about, central aperture 138. Each interacting structure 140 preferably comprises: an arm 142 which extends radially into central aperture 138 from forward end wall 134; and a rounded boss 144 projecting forwardly from the distal end portion of lateral arm 142.

As is commonly the case with baitcasting reels, reel 20 includes an interior spool cover 146 comprising: a cylindrical interior cavity 148 for holding a spool shaft bearing or bushing 150; a plurality of (preferably two) radially projecting ears 152; apertures 154 provided through radial ears 152; and a radially projecting, partial ear structure 156 having a semicircular notch 158 formed in the outer end thereof. Apertures 154 and notch 156 are sized and positioned to receive internally-threaded bosses 160, provided in the interior of side cover 40, such that spool cover 146 can be secured to side cover 40 by means of bolts or screws 162.

Figure 11:
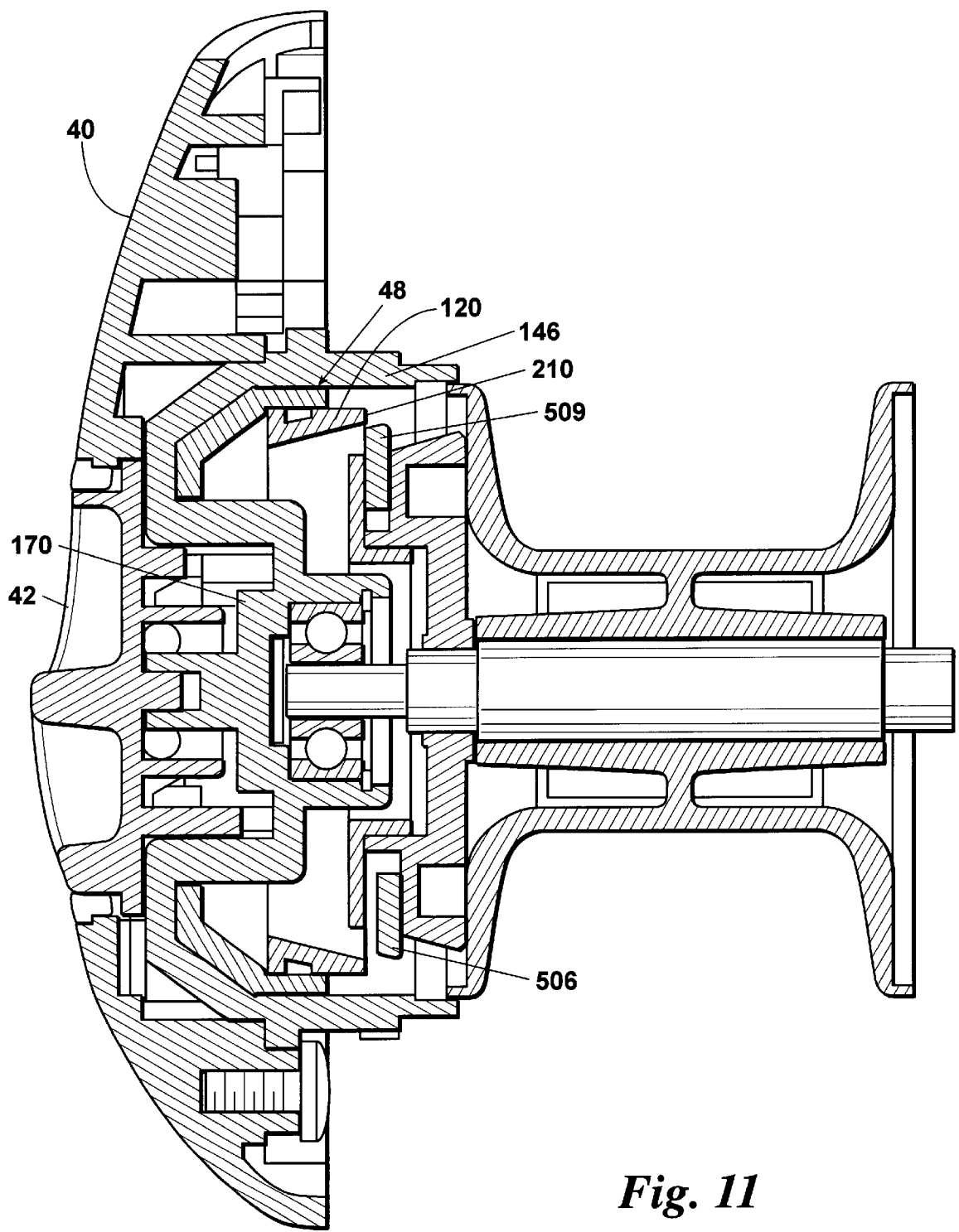
FIG. 11 provides a partial cutaway view of the left side of a bait cast fishing reel having the inventive braking apparatus incorporated therein.
Figure 12:
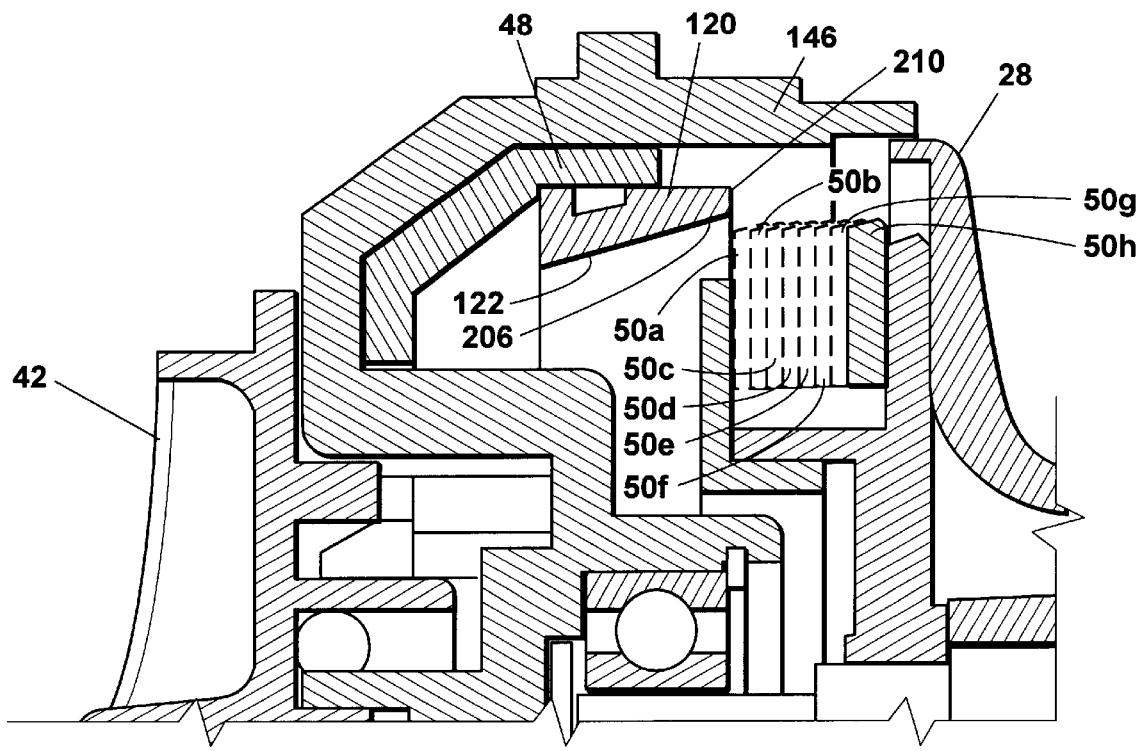
FIG. 12 provides a cutaway view of the inventive braking apparatus in the non-braking position.
Figure 13:
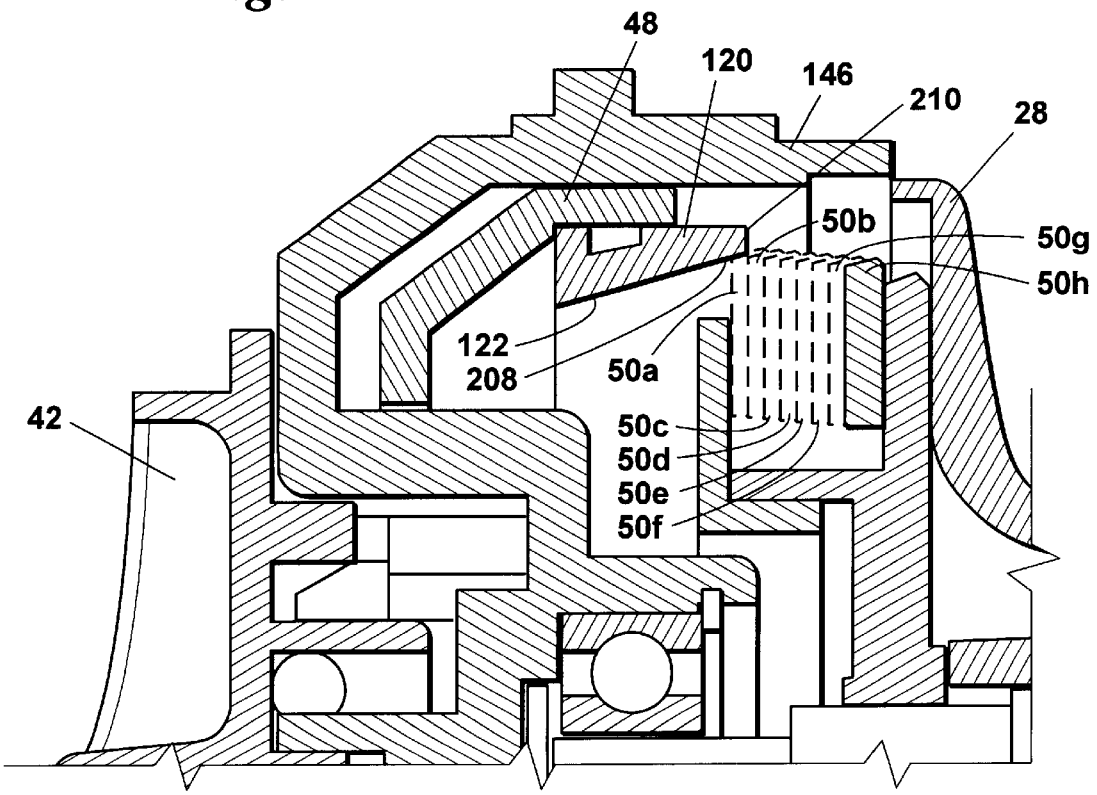
FIG. 13 provides a cutaway view inventive braking apparatus in the initial braking position.
Figure 14:
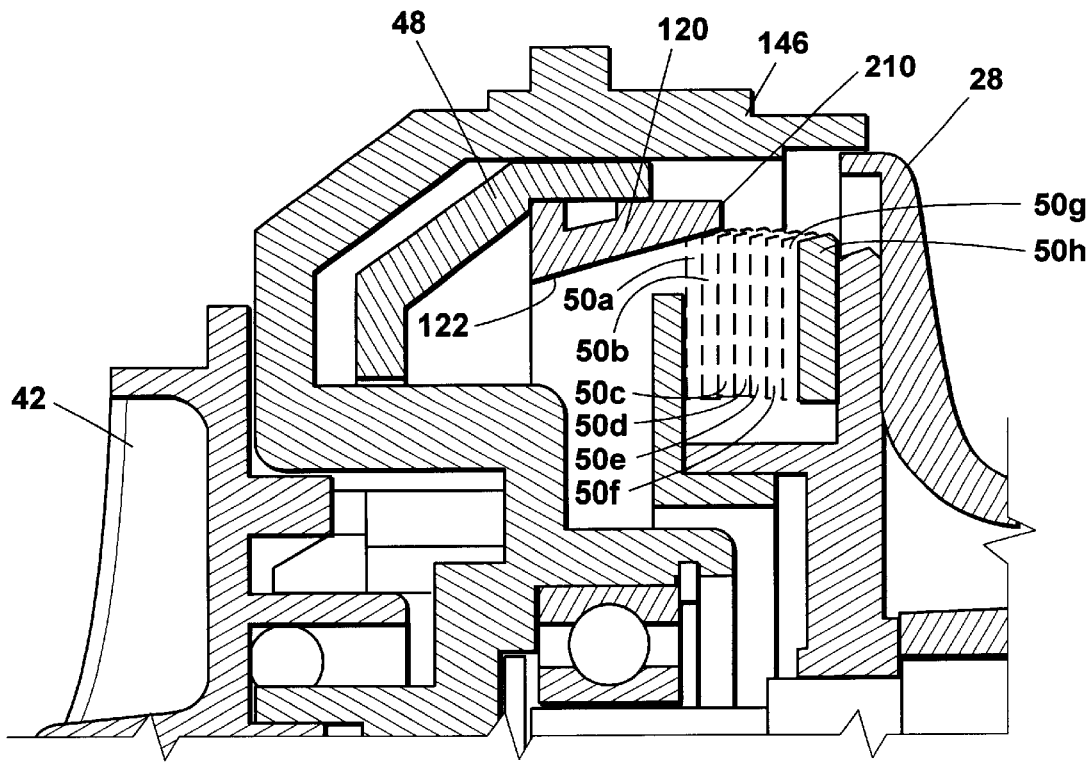
FIG. 14 provides a cutaway view of the inventive braking apparatus in a partial braking position.
Figure 15:
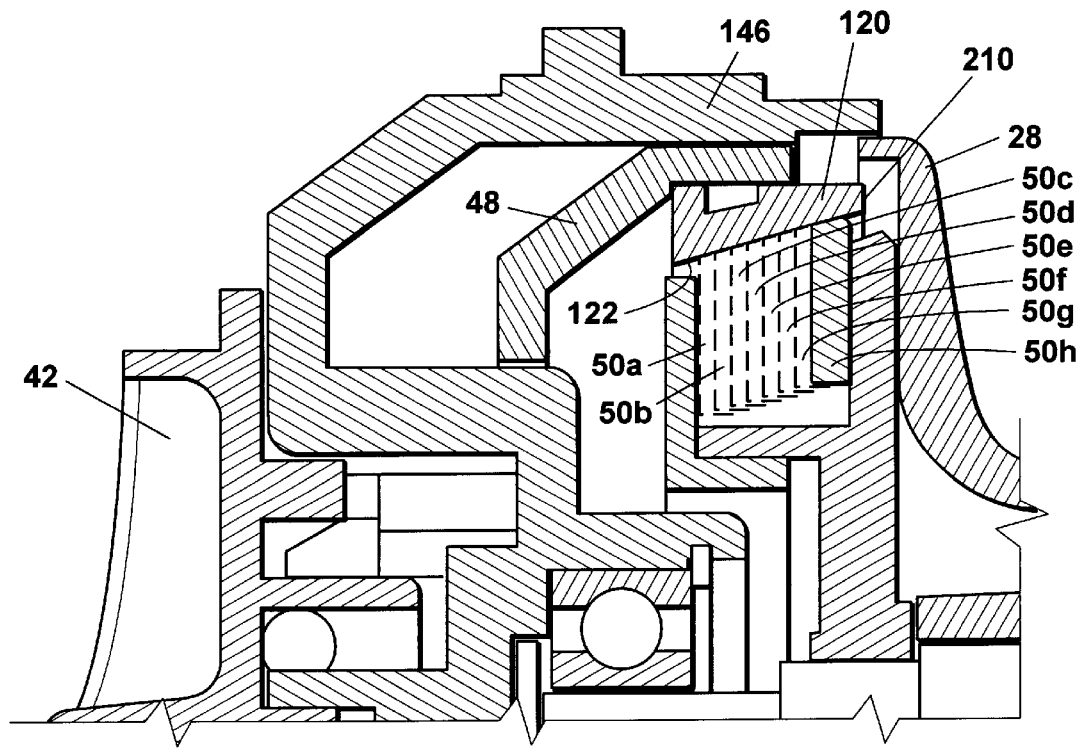
FIG. 15 provides a cutaway view of the inventive braking apparatus in the full braking position.

In the inventive apparatus, spool cover 146 is preferably modified to include: a cylindrical cavity 164 provided in the forward face of spool cover 146; a substantially cylindrical interior wall 166 provided in cylindrical cavity 164; a radial wall 168 provided at the interior end of cylindrical cavity 164; a cylindrical cap 170 (FIG. 11) projecting forwardly from the center of interior end wall 168; a circular gap 172 formed between cap 170 and cylindrical interior wall 166; a cylindrical guide post 174 projecting forwardly from the center of cylindrical cap 170 and a plurality of slots 176 provided through interior end wall 168 and extending longitudinally into the cylindrical wall 166 of cavity 164. The number of longitudinal slots 176 provided in spool cover 146 corresponds to the number of interacting structures 140 provided at the forward end of brake collar 124.

Longitudinal slots 176 are sized and spaced such that interacting structures 140 are receivable in slots 176 for reciprocating forward and rearward movement with respect to spool cover 146. As interacting structures 140 reciprocate in slots 176, the rounded bosses 144 of interactive structures 140 will be positioned either in or forwardly of the circular gap 172 formed in cylindrical cavity 164.

Spool cover 146 also includes a plurality of rearwardly projecting, internally threaded bosses (not shown) which are sized and spaced for receipt through the forward bores 136 of brake collar 124 such that collar 124 can slide forwardly and rearwardly on bosses 178. With the bosses received through bores 136, Biasing members 180, preferably springs or similarly resilient members, are positioned around the bosses and are held in place by means of bolts or screws 182. Springs 180 exert a continuous, biasing force against the forward end wall 134 of brake collar 124 and thus continuously act to urge collar 124 forwardly within spool cover 146.

As best seen in FIGS. 2 and 3, brake dial 42 preferably comprises: a circular dial plate 184; a grasping structure 186 provided on the forward face of dial plate 184; a cylindrical cup 188 extending from the center of the rearward face of dial plate 184 and sized for rotatably receiving cylindrical guide post 174; and three curved cams 190 projecting from the rearward face of dial plate 184. Cams 190 are arranged in a circular pattern around cylindrical cup 188. Cams 190 are receivable in the forward, cylindrical cavity 164 of spool cover 146 for rotational movement adjacent to cylindrical interior wall 166. Cams 190 interact with interacting structures 140 to thereby selectively move brake ring assembly 48 through a range of braking positions.

Grasping structure 186 projects forwardly from the forward face of dial plate 184 and includes: a cylindrical exterior wall 192; a forwardly projecting ridge 194 extending laterally across the center of grasping structure 186; and a pair of finger slots or finger cavities 196 which are formed in the forward face of grasping structure 186 and are separated by ridge 194. The transition from the cylindrical exterior wall 192 of clasping structure 186 to circular dial plate 184 forms a forwardly facing, radial shoulder 198 which extends around brake dial 42.

Each of cams 190 is operable for interacting with an interacting structure 140. In the preferred embodiment, each cam 190 is of continuous slope, and all three cams 190 have the same, continuous slope. It will be apparent to one skilled in the art that, if it was desirable to have specific brake settings, flat areas could be included on the cam to produce discrete brake settings which would be readily recognized by a fisherman. In addition, the ramps could be of variable slope, thereby varying the responsiveness of the adjustment mechanism over its operating range.

Brake dial 42 is rotatably held between (a) an internal radial shoulder 200 formed in side cover 40 around circular aperture 44 and (b) the outer face 202 of spool cover 146. As indicated in FIG. 2A, a thin, friction reducing ring 204, washer, or other such element is preferably positioned between the forward radial shoulder 198 of brake dial 42 and the interior radial shoulder 200 of side cover 40. The rearward face of dial plate 184 slidably abuts the outer face 202 of spool cover 146.

When the inventive apparatus is assembled, springs 180 urge brake collar 124 forward such that the interacting structures 140 of collar 124 are maintained in operable contact with dial cams 190. When the rounded bosses 144 of interacting structures 140 are positioned at the base of cam 190, brake ring assembly 48 is held in a fully forward position. As the user turns brake dial 42 counterclockwise, the cam 190 acts against interacting structures 140 to push interacting structures 140 and brake ring assembly 48 rearward. When the brake 42 dial is placed in its full counterclockwise position, interacting structure 140 is in contact with the outer end of cam 190 thereby placing brake ring assembly 48 at its rearmost position.

Referring next to FIGS. 12–15, it can be seen that the positioning of the brake elements 50a–h in housing 52 operates in conjunction with the axial movement of brake ring 120 to produce a desired level of braking effect. The longitudinal axis 56 of the each brake element 50a–h contained in slots 88a–h, respectively, lies in a unique plane perpendicular to housing axis 74, different from a plane so defined for longitudinal axis 56 of any other brake element 50a–h. Due to the differing depths of slots 88a–h, each plane is spaced progressively rearwardly from the previous plane. As illustrated in FIG. 19, when brake ring 120 is placed in forward most, non-braking position 206, none of brake elements 50a–h can contact braking surface 122. An initial braking position 208 is defined at the point rearward from the non-braking position 206 where braking surface 122 begins to contact the braking element 50a retained in slot 88a. As brake dial 42 is turned counterclockwise to move brake ring 120 rearward, braking surface 122 successively begins to contact individual elements 50b–h thereby increasing the relative braking force applied in response to a given rotational speed. In addition, the conical nature of brake ring 120 provides variable braking effect, both as individual brake elements 50 first begin to contact braking surface 122 and, as the brake ring 120 is moved rearward, the brake ring 120 automatically reduces the radius over which an active element 50 operates, thereby varying the braking force applied by that brake element 50 to the braking surface 120. These effects work in concert to provide a braking system which is infinitely adjustable over its braking range. When dial 42 is rotated to its full counterclockwise position, brake ring 120 is placed in its rear most position such that all brake elements 50a–h can contact the braking surface 122.

As will be apparent to those skilled in the art, the inventive system ensures that brake elements 50 can only contact brake ring 120 at its braking surface 120, thus, brake elements 50 will not bind against the rearward edge 210 of brake ring 120 but will always be maintained in proper position with respect to braking surface 122.

As will be understood by those skilled in the art, although the preferred embodiment of the inventive apparatus utilizes three cams 190 and three corresponding interacting structures 140, the inventive apparatus could optionally utilize one, two, three, or more cams 190 and corresponding structures 140.

As will also be understood by those skilled in the art, although the inventive braking element assembly 52 is preferred, other types of braking element assemblies (e.g., radially extending rods having braking weights, pads, and/or bristles slidably mounted thereon) could be used in the inventive braking apparatus. However, regardless of the type of assembly used, it is preferred that some or all of the individual braking elements be positioned at differing longitudinal locations along the assembly's rotational axis. The positioning of the brake elements will preferably be such as to ensure that the brake ring will sequentially encompass additional elements or additional groups of elements as the brake ring is adjusted from a non-contacting position to a full contacting position. In addition it is preferable that the brake elements have an angled portion for proper contact with braking surface 122 and that the elements are retained in a manner that ensures proper alignment between the brake elements and the braking surface 122.

Figure 10:
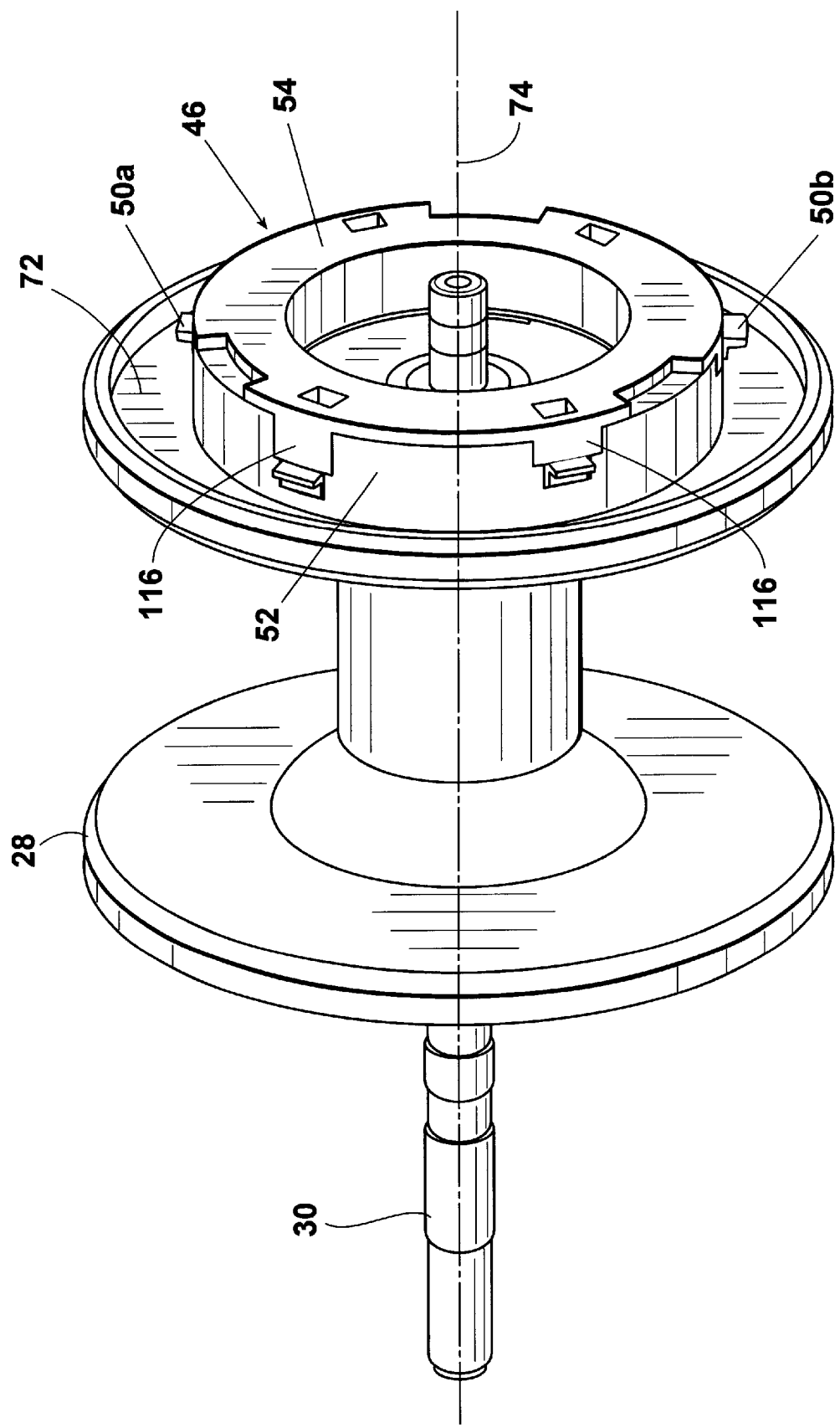
FIG. 10 provides a perspective view of an alternate embodiment of the brake element assembly.

It will be further understood by those skilled in the art that the inventive apparatus can be employed in generally any type of baitcasting reel. Further, it will be apparent to those skilled in the art that the inventive apparatus can be easily reconfigured to incorporate more or fewer braking elements 50. For example FIG. 10 depicts an alternate preferred embodiment of the inventive brake assembly wherein six brake elements 50a–f are used.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

What is claimed is:

1. A braking apparatus for a fishing reel comprising:
   a carrying structure for carrying a braking surface, said braking surface having a substantially frusto-conical shape;
   a rotatable line spool;
   a plurality of brake elements which will rotate with said line spool and are operable for contact with said braking surface;
   at least one turnable cam including at least one ramp segment having an outer end and a base end;
   at least one interacting member, projecting from said carrying structure, for interacting with said cam; and
   at least one biasing member for continually urging said interacting member into contact with said cam, wherein,
   when said interacting member is in contact with said base end, said braking surface will be located at a first position,
   when said interacting member is in contact with said outer end, said braking surface will be located at a second position, and
   said brake elements are positioned to be sequentially encompassed by said braking surface as said braking surface is moved between said first position and said second position.

2. The braking apparatus of claim 1 further comprising:
   a plurality of said turnable cams having said base end and said outer end and
   a corresponding number of said interacting members, projecting from said carrying structure, for interacting with said cams,
   wherein said base end of each said cam corresponds to said first position and said outer end of each said cam corresponds to said second position.

3. The braking apparatus of claim 2 wherein said cams project from a dial structure and said dial structure can be manually operated from outside of said reel.

4. The braking apparatus of claim 1 wherein:
   said cam is of substantially constant slope; and
   said cam can be turned to selectively move said interacting member to any position between said base end and said outer end.

5. The braking apparatus of claim 1 wherein said fishing reel includes a spool cover having an exterior and said braking apparatus further includes:
   a cavity provided in said exterior for receiving said cam said cavity having a cavity wall and
   a slot provided through said cavity wall for receiving said interacting member such that said intenting member projects through said slot and into said cavity for reciprocating movement win said cavity.

6. The braking apparatus of claim 5 further comprising:
   a plurality of said turnable cams receivable in said cavity;
   a corresponding number of said interacting members, projecting from said structure, for interacting with said cams; and
   a plurality of said slots provided through said cavity wall for receiving said interacting members such that said interacting members project through said slots and into said cavity for reciprocating movement within said cavity.

7. The braking apparatus of claim 6 wherein said cavity wall is a substantially cylindrical wall and said slot extends longitudinally in said cavity wall.

8. The braking apparatus of claim 1 wherein:
   none of said braking element can contact said braking space when said braking surface is located at said first position; and
   all of said braking element can contact said braking surface when said braking surface is in said second position.

9. A braking apparatus for a fishing reel comprising:
   a frusto-conical contacting structure, said contacting structure movable in at least a first direction;
   a plurality of braking elements for contacting said contacting structure to generate a braking force;
   placing means for selectively moving said contacting structure in said first direction, wherein
   said brake elements are positioned to be sequentially encompassed by said contacting structure as said contacting structure is moved in said first direction.

* * * * *

UNITED STATES PATENT AND TRADEMARK OFFICE
CERTIFICATE OF CORRECTION

PATENT NO.   : 6,422,498 B1
DATED        : July 23, 2002
INVENTOR(S)  : Christopher S. Littau and Hyunkyu Kim It is certified that error appears in the above-identified patent and that said Letters Patent is hereby corrected as shown below:

Column 8,
Line 33, replace "intenting" with -- interacting --
Line 35, replace "win" with -- within --
Line 51, replace "space" with -- surface --

Signed and Sealed this

Third Day of September, 2002

Attest:

Attesting Officer

JAMES E. ROGAN
Director of the United States Patent and Trademark Office